US007812055B2

(12) United States Patent
Ahlnäs

(10) Patent No.: US 7,812,055 B2
(45) Date of Patent: Oct. 12, 2010

(54) METHOD FOR TREATING WOOD

(75) Inventor: Thomas Ahlnäs, Kotka (FI)

(73) Assignee: Oy Granula Ab Ltd., Kotka (FI)

( * ) Notice: Subject to any disclaimer, the term of this patent is extended or adjusted under 35 U.S.C. 154(b) by 659 days.

(21) Appl. No.: 11/794,669

(22) PCT Filed: Jan. 4, 2006

(86) PCT No.: PCT/FI2006/000007

§ 371 (c)(1),
(2), (4) Date: Aug. 8, 2007

(87) PCT Pub. No.: WO2006/072659

PCT Pub. Date: Jul. 13, 2006

(65) Prior Publication Data

US 2009/0208767 A1 Aug. 20, 2009

(30) Foreign Application Priority Data

Jan. 4, 2005 (FI) .................................. 20050003

(51) Int. Cl.
*A01N 37/00* (2006.01)
*A01N 37/44* (2006.01)

(52) U.S. Cl. ........................ 514/553; 514/557; 514/578

(58) Field of Classification Search ................. 514/553, 514/557, 578
See application file for complete search history.

(56) References Cited

U.S. PATENT DOCUMENTS

| | | | |
|---|---|---|---|
| 2,291,634 | A | 1/1940 | Katzman et al. |
| 2,311,910 | A | 2/1943 | Straughn |
| 6,087,303 | A | 7/2000 | Walker et al. |
| 6,352,583 | B1 | 3/2002 | Goettsche et al. |
| 2005/0124723 | A1 | 6/2005 | Fritschi et al. |

FOREIGN PATENT DOCUMENTS

| | | | |
|---|---|---|---|
| EP | 0 039 538 | A1 | 11/1981 |
| EP | 0 238 051 | A1 | 7/2001 |
| FI | 103704 | B | 8/1999 |
| FI | 110661 | B | 3/2003 |

*Primary Examiner*—Raymond J Henley, III
(74) *Attorney, Agent, or Firm*—Young & Thompson

(57) ABSTRACT

Described is a method and a composition for preparing wood, to its use and to the wooden product obtained by the method. The method and the composition use liquid or water-soluble organic ammonium carboxylate of formula (1): $[NR^1R^2R^3R^4]^+n[R^5(COO)_n]^{-n}$ (1), in which $R^1$, $R^2$ and $R^3$ are selected from hydrogen, substituted alkyls containing 1-6 carbon atoms and unsubstituted alkyls containing 1-6 carbon atoms, $R^4$ is a substituted alkyl or an unsubstituted alkyl containing 1-6 carbon atoms, $R^5$ is hydrogen, a substituted hydrocarbyl containing 1-6 carbon atoms or an unsubstituted hydrocarbyl containing 1-6 carbon atoms, and n is an integer 1-6. This substance has good absorption into and high retention in wood.

44 Claims, 6 Drawing Sheets

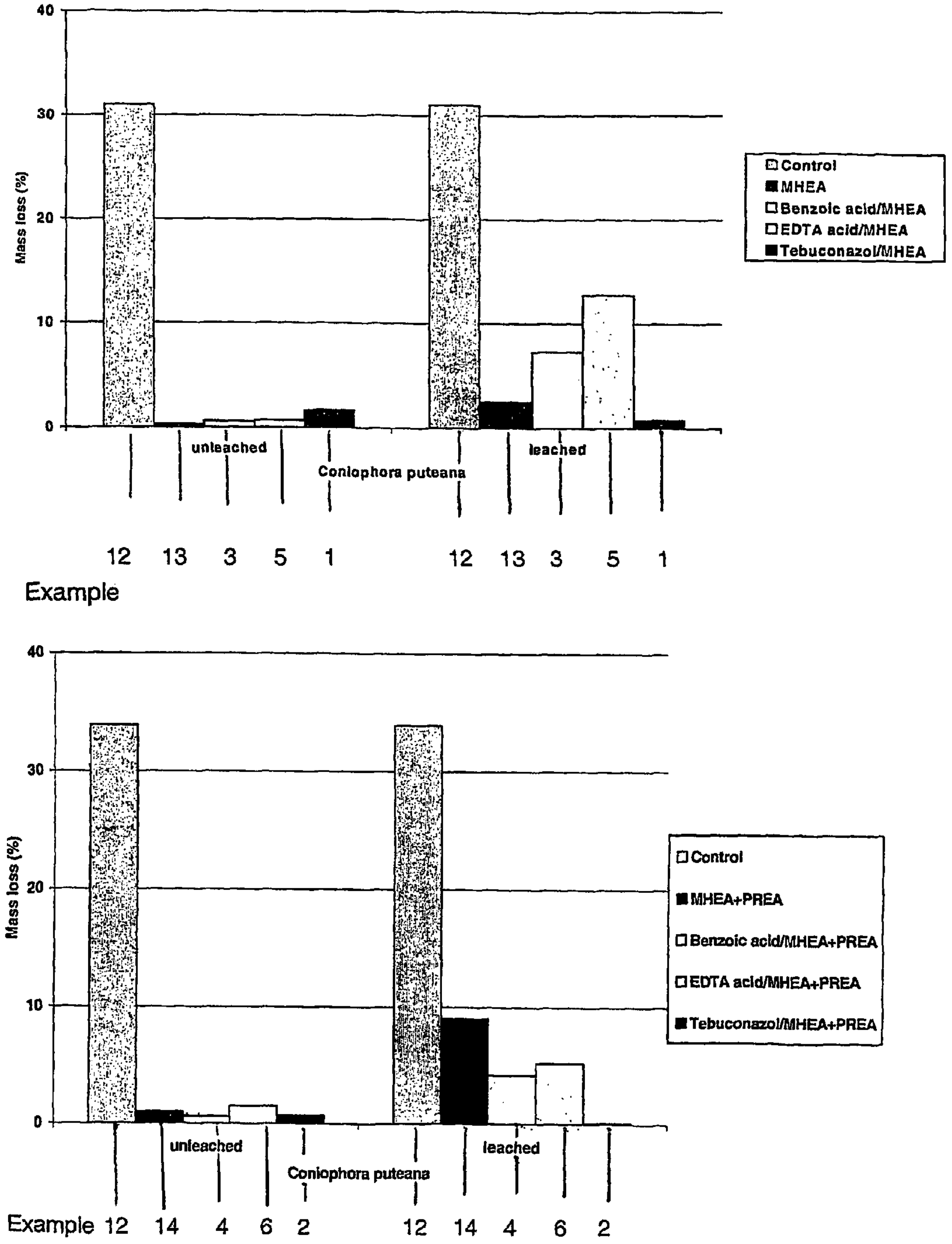
Figure 1. Anti-decay effect of commercial and new active ingredients when mixed in MHEA and MHEA+PREA carriers.

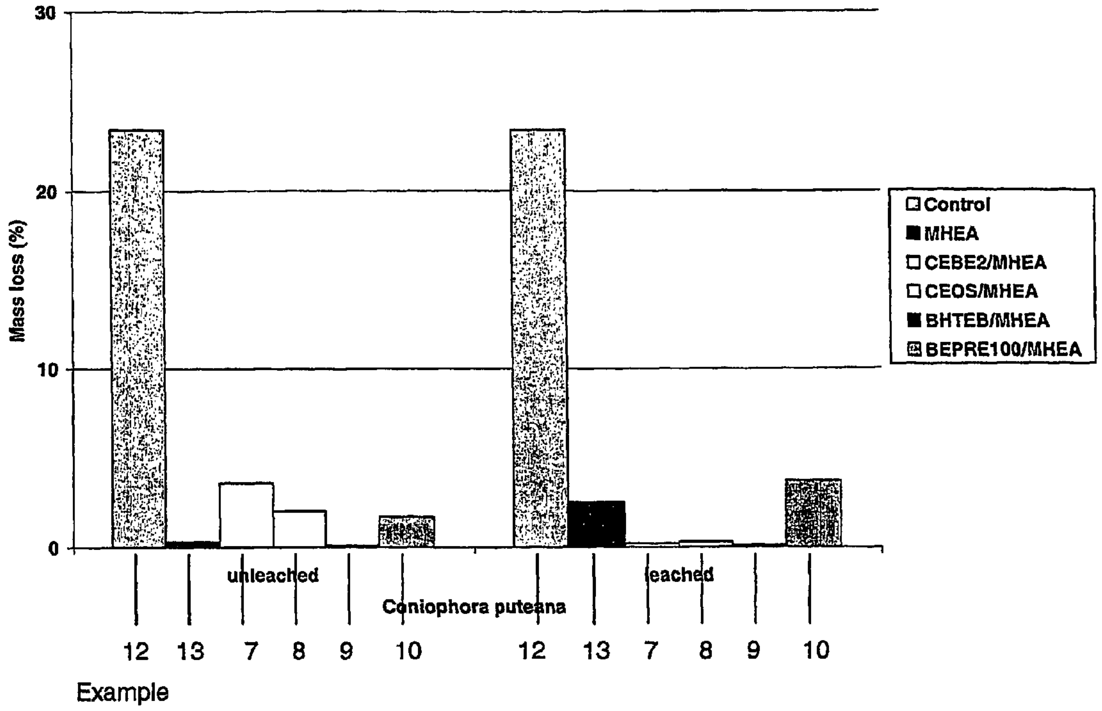
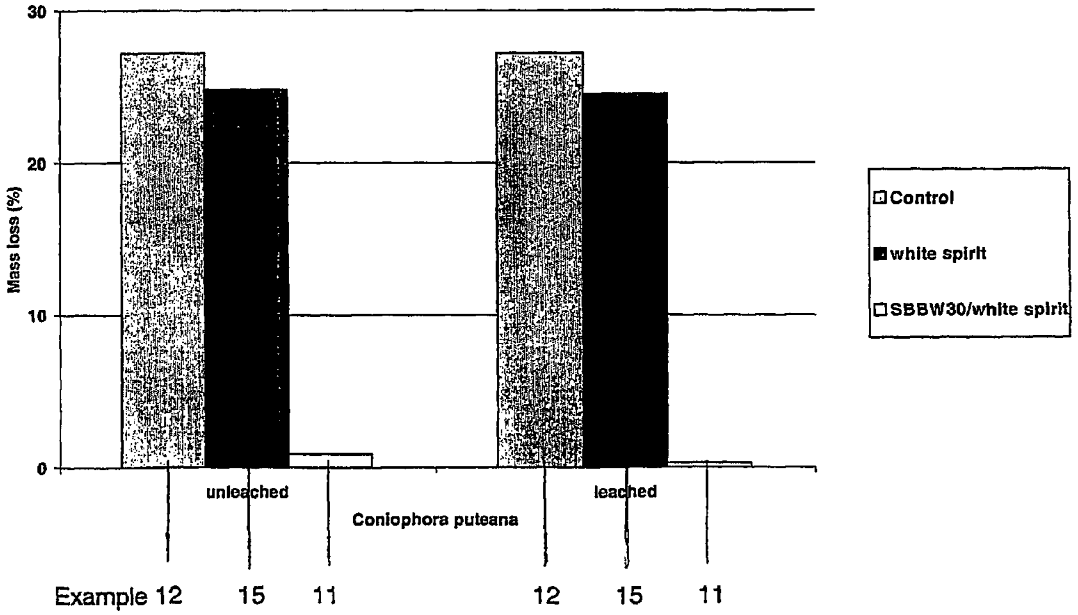
Figure 2. Anti-decay effect of mixtures of active ingredient and carrier prepared by the company Granula Oy.

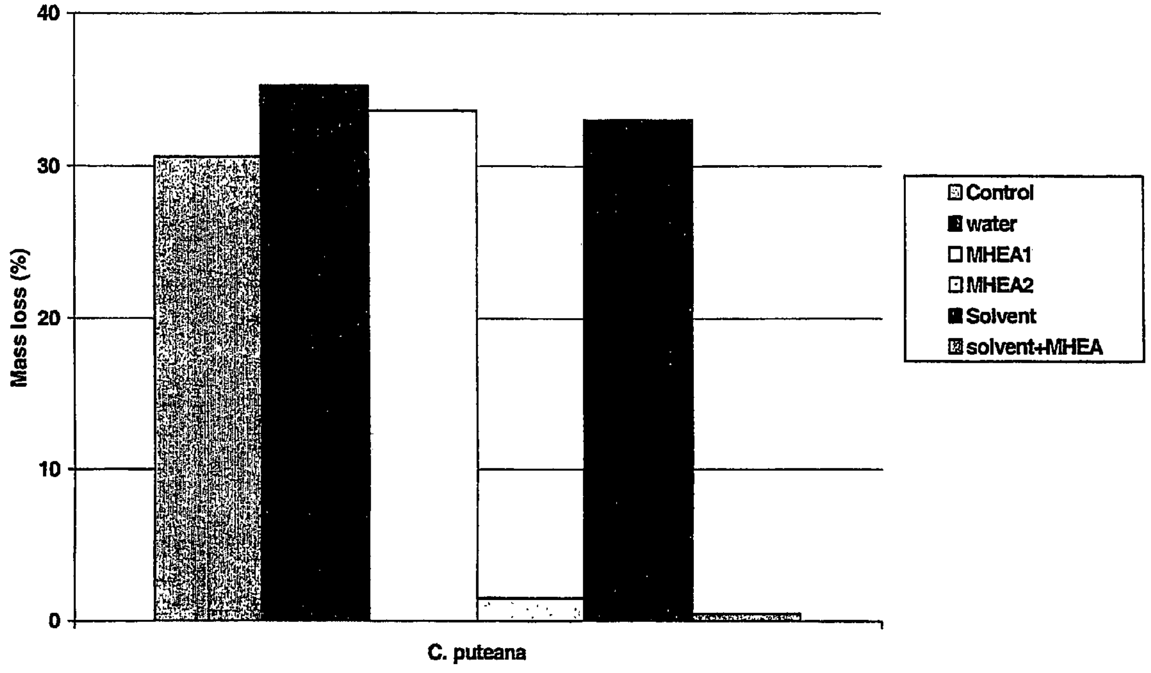
Figure 3. Effect of the extraction schedules on the anti-decay properties of wood material.

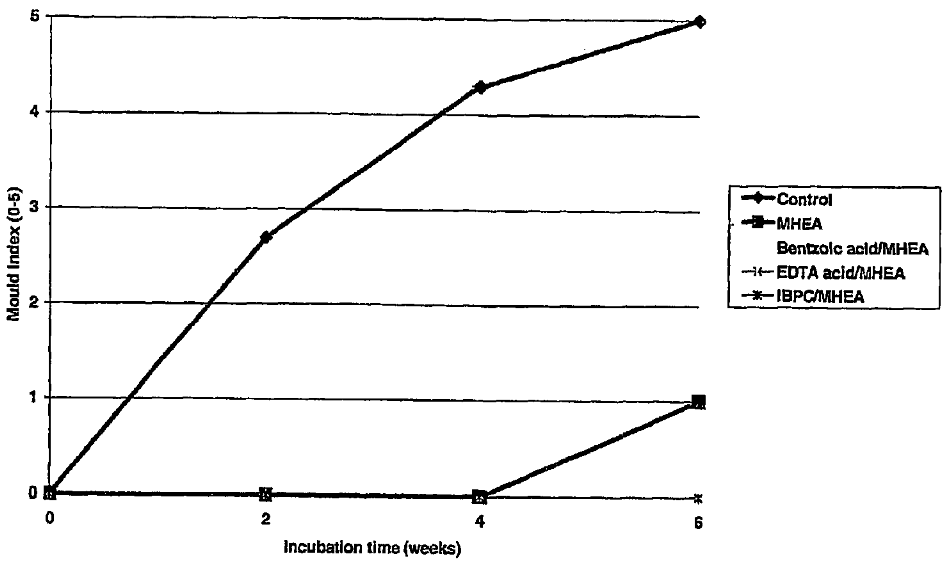
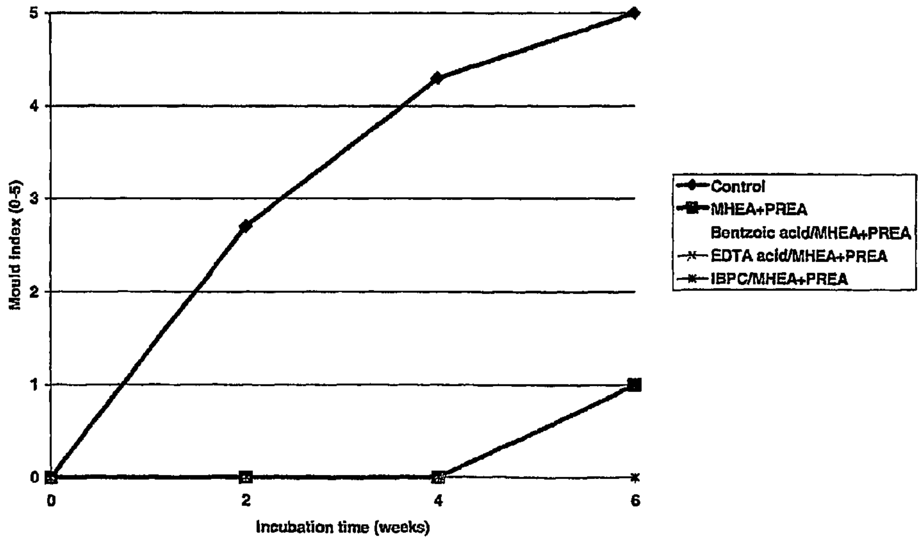
Figure 4. Anti-mildew effect of commercial and new active ingredients when mixed in MHEA and MHEA+PREA carriers.

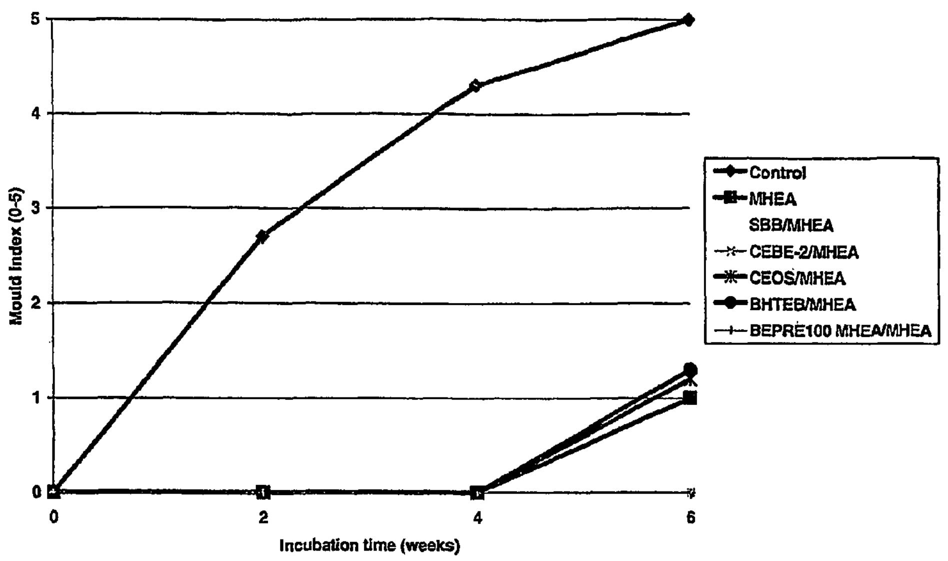
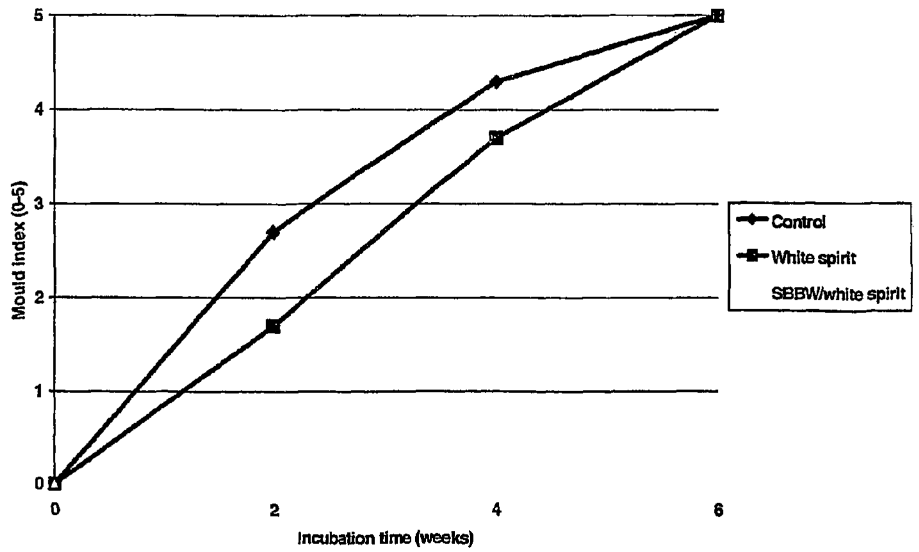
Figure 5. Anti-mildew effect of the mixtures of active ingredient and carrier produced by the company Granula Oy.

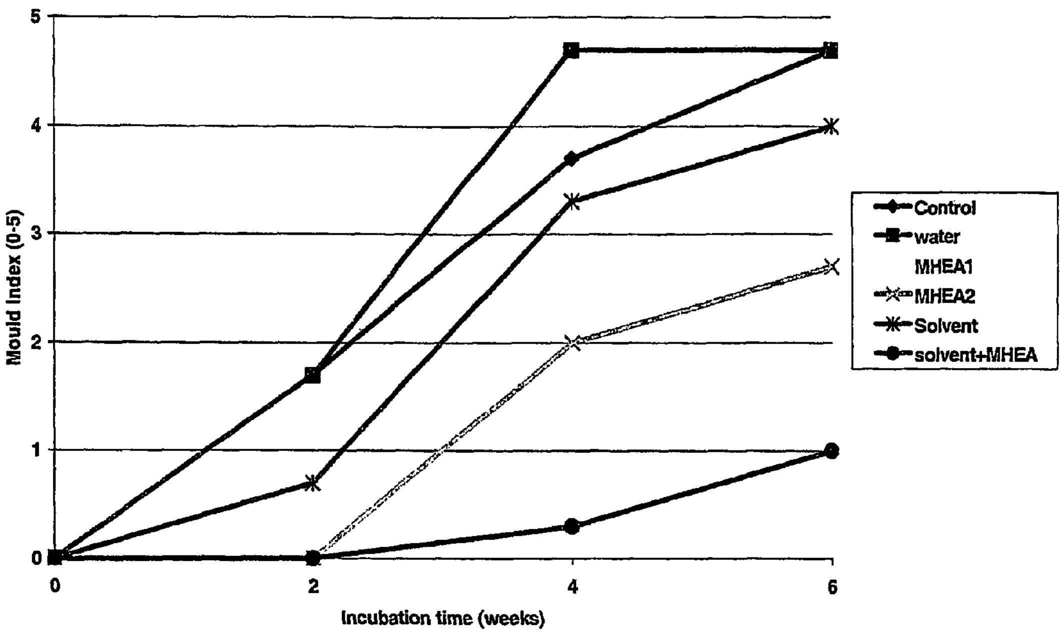
Figure 6. Effect of the extraction schedules on the anti-decay properties of wood material.

METHOD FOR TREATING WOOD

BACKGROUND OF THE INVENTION

The invention relates to a method for treating wood, in which wood is contacted with liquid or water-soluble organic ammonium carboxylate. The invention also relates to a wood preservative composition containing organic ammonium carbonate and to the use of such a composition for wood preparation. Finally, the invention relates to a wood product produced by the wood-preparing method mentioned above.

DESCRIPTION OF THE RELATED ART

WO patent specification 95/27600, example 2, discloses a wood preservative comprising, in addition to zinc and copper acetate, ammonium acetate and preferably a quaternary ammonium compound, such as didecyl dimethyl ammonium chloride.

U.S. Pat. No. 4,929,454 (column 2, line 60-column 3, line 6) discloses a method for preparing wood by impregnating wood with zinc, copper and a quaternary ammonium compound, which may consist of tertiary $C8-C_{20}$ alkyl ammonium salt of fatty acid. However, the use of copper and zinc may cause environmental and corrosive problems.

EP patent specification 1 114 704 A2 discloses a wood preservative without copper and zinc, which contains water-soluble organic ammonium carboxylate. The ammonium ion of this quaternary ammonium carboxylate comprises a $C_1$-$C_{20}$ alkyl group or an aryl substituted alkyl group and at least one, preferably two alkyl groups containing 8-20 carbon atoms, cf. paragraph [0051] of the specification. The carboxylate may be e.g. acetate, cf. paragraph [0224], or propionate, cf. paragraph [0219]. In addition to a microbicide property, the preservatives containing quaternary ammonium carboxylates of the reference have enhanced retention, and they can even be used without metal stabilisers, such as combinations of arsene, chromium, copper and zinc, cf. paragraph [0032] of the reference.

However, the ammonium carboxylates of these references involve the problem of not being absorbed into wood in adequate amounts, or of having poor retention in wood. The purpose of the invention is thus to provide a method and a composition for preparing wood, in which the composition is both well absorbed and has good retention.

There are also several prior art methods for preparing wood, in which wood is impregnated with copper compounds, a reaction mixture or a complex of ammonium carboxylate and copper compounds (e.g. U.S. Pat. No. 6,352,583 and EP 238 051). Such wood preservatives have the drawback of using toxic copper compounds and/or of having poor retention in wood and/or poor absorption into wood. Thus, one objective of the invention is to provide a method for preparing wood, which does not require the use of arsenic, chromium, copper or zinc compounds as stabilisers.

BRIEF DESCRIPTION OF THE DRAWINGS

FIG. 1 shows an anti-decay effect of commercial and new active ingredients when mixed in MHEA and MHEA+PREA carriers.

FIG. 2 shows an anti-decay effect of mixtures of active ingredient and carrier prepared by the company Granula Oy.

FIG. 3 shows an effect of the extraction schedules on the anti-decay properties of wood material.

FIG. 4 shows an anti-mildew effect of commercial and new active ingredients when mixed in MHEA and MHEA+PREA carriers.

FIG. 5 shows an anti-mildew effect of the mixtures of active ingredient and carrier produced by the company Granula Oy.

FIG. 6 shows an effect of the extraction schedules on the anti-decay properties of wood material.

DESCRIPTION OF THE PREFERRED EMBODIMENTS

The problems mentioned above have now been resolved with a new method for preparing wood with liquid or water-soluble organic ammonium carboxylate of the type above, which is principally characterised by the fact that the organic ammonium carboxylate has the formula (1):

$$[NR^1R^2R^3R^4]^{30}{}_n[R^5(COO)_n]^{-n} \quad (1)$$

in which $R^1$, $R^2$ and $R^3$ have been selected from the group comprising hydrogen, substituted alkyls having 1-6 carbon atoms and unsubstituted alkyls having 1-6 carbon atoms, $R^4$ is a substituted alkyl having 1-6 carbon atoms or an unsubstituted alkyl having 1-6 carbon atoms, $R^5$ is hydrogen, a substituted hydrocarbyl having 1-6 carbon atoms or an unsubstituted hydrocarbyl having 1-6 carbon atoms, and n is an integer between 1-6. Such an ammonium carboxylate is readily absorbed in very large amounts into wood and is subsequently retained in the wood.

Wood preparation involves contacting the wood with another substance. Organic ammonium carboxylate stands for a salt or a complex formed of an ammonium cation and a carboxylic anion. Hence one or more ammonium ions of the salt or complex may be primary ($RNH_3^+$), secondary ($R_2NH_2^+$), tertiary ($R_3NH^+$) or quaternary ($R_4N^+$). The carboxylate ion of the salt or complex may be monovalent ($RCOO^-$) or polyvalent ($R(COO^-)_{n>1}$), and in that case it may also comprise unneutralised carboxyl groups (—COOH). In the latter case, $R^5$ is defined as being substituted with carboxyl.

FI patent specifications 103704 B and 110661 B disclose methods for fodder preservation by means of ammonium carboxylates having a structure similar to that of the compounds of formula (1). Nonetheless, the problems occurring in fodder preservation are different from those relating to the present wood preparation method, because fodders are not prepared with chelating agents and toxic metals such as copper, and impregnation of fodder with preservatives does not involve the same problems as impregnating wood with wood preservatives. The objective of fodder preservation is lactic acid fermentation together with prevention of harmful microbial, yeast and mildew growth.

Group $R^5$ in formula (1) is preferably hydrogen, substituted alkyl containing 1-6 carbon atoms or unsubstituted alkyl containing 1-6 carbon atoms, more advantageously hydrogen, substituted alkyl containing 14 carbon atoms or unsubstituted alkyl containing 1-4 carbon atoms. The terms "substituted" and "unsubstituted" refer basically to groups containing heteroatoms (e.g. —OH, —$NH_2$, —COOH).

Since the group $R^5$ is associated with a carboxylate group, the ammonium carboxylate of formula (1) is preferably based on a lower organic carboxylic acid and it can be prepared from such an acid or its salt. Lower organic acids include lower fatty acids such as formic acid, acetic acid, propionic acid, n- and i-butyric acid, and n- and i-pentanic acid. Useful acids also include benzoic acid and oxycarboxylic acids such as glycolic acid and lactic acid. Lower dicarboxylic acids such as oxalic acid, malonic acid, succinic acid and glutaric acid are also applicable.

Group $R^5$ of formula (1) is most advantageously hydrogen, methyl or ethyl. In formula (1), n is preferably 1 or 2, most advantageously 1. Consequently, the most advantageous organic ammonium carboxylate used in the method of the invention is based on lower fatty acids.

As mentioned above, the ammonium ion of formula (1) may be primary ($RNH_3^+$), secondary ($R_2NH_2^+$), tertiary ($R_3NH^+$) or quaternary ($R_4N^+$), and then R is typically a substituted or unsubstituted alkyl containing 1-6 carbon atoms. Typical ammonium ions containing unsubstituted alkyls have been formed from water-soluble amines such as methylamine (g), dimethylamine, trimethylamine, ethylamine, diethylamine, etc.

Ammonium ions containing substituted alkyls have typically been formed from water-soluble amines, whose alkyl(s) have been substituted with one or more hydroxyl groups. In formula (1), $R^1$ is preferably hydrogen and $R^2$ and $R^3$ have preferably been selected from the group comprising hydrogen and $C_1$-$C_6$-alkyls substituted with a hydroxyl group, preferably from the group comprising hydrogen and $C_1$-$C_4$-alkyls substituted with a hydroxyl group. $R^4$ is preferably a $C_1$-$C_6$-alkyl substituted with a hydroxyl group, most advantageously a $C_1$-$C_4$-alkyl substituted with a hydroxyl group.

Organic ammonium carboxylates formed of lower alkanolamines are hence particularly useful. Among lower alkanolamines we may cite monoethanolamine, diethanolamine, triethanolamine, monoisopropanolamine, di-isopropanolamine, tri-isopropanolamine, mono-sek-butanolamine, di-sek-butanolamine and tri-sek-butanolamine.

One important group of useful alkanolamines comprises lower alkyl alkanolamines, such as methyl ethanolamine, dimethylethanolamine, diethylethanolamine, butylethanolamine, methyldiethanolamine and ethyldiethanolamine. Additional information about useful alkanolamines can be found in the book Kirk-Othmer, Encyclopedia of Chemical Technology 3rd Ed., Vol. 1, p. 944, which is incorporated in this disclosure.

It is particularly recommendable that $R^1$ is hydrogen, $R^2$ and $R^3$ are selected from the group comprising hydrogen and ethyl substituted with a hydroxyl group, preferably from the group comprising hydrogen and 2-hydroxy ethyl, and $R^4$ is ethyl substituted with a hydroxyl group, preferably 2-hydroxy ethyl. Consequently, the ammonium carboxylate in accordance with the invention is preferably based on ordinary mono, di or triethanolamine.

In the most advantageous embodiment, the organic ammonium carboxylate of formula (I) is selected from the group comprising a salt or a complex of formic acid and monoethanolamine and a salt or a complex of propionic acid and monoethanol amine. These agents will provide maximum absorption of the substance into wood and retention in the wood. In one optional embodiment, organic ammonium carboxylate is a mixture of a salt of formic acid and monoethanolamine and a salt of propionic acid and monoethanolamine, preferably in the weight ratio 80:20-20:80.

The ammonium carboxylate of formula (1) can also be contacted with wood by preparing it from its starting material in situ, in other words substantially in contact with wood. Typical starting materials then comprise hydroxide or a salt formed by an ammonium ion of formula (1), such as chloride, and an acid or salt formed by an acid ion of formula (1), e.g. sodium salt, resulting mainly in the following reaction (2):

$$nNR^1R^2R^3R^4X+R^5(COOM)_n\rightarrow[NR^1R^2R^3R^4]^+{}_n[R^5(COO)_n]^{-n}+nMX \quad (2)$$

stable in which $R^1$, $R^2$, $R^3$, $R^4$, $R^5$ and n are identical to those of formula (1) and X and M are an anion respectively a cation forming a stable acid or salt. Typical anions X comprise hydroxyl and halogenides and typical cations M comprise proton and alkali and earth alkali metals.

In the practice, ammonium carboxylate of formula (1) is prepared e.g. by mixing an ammonium cation source and a carboxyl anion source in the desired molar ratio, either without a medium or by using an appropriate solvent such as water as a medium. When the starting material is an amine and an acid, they are simply mixed during gentle heating, if necessary. When the starting materials consist of salts, they are typically dissolved separately in water, and then the solutions are combined. If the salt or complex thus formed is hydrophobic, it will separate from the water phase as an unctuous or paste-like deposit or a wax-like precipitate, and it can be separated from the water phase by any known methods. When both the starting materials and the formed product are hydrophobic, the preparation can be carried out in an organic solvent instead of water.

In the method for preparing wood in accordance with the invention, the organic ammonium carboxylate of formula (1) is preferably in the form of an aqueous solution. The aqueous solution preferably has a concentration of e.g. 5-95% by weight and typically 15-45% by weight.

In one preferred embodiment of the invention, wood is prepared with a view to protect it from micro-organisms. In that case, the organic ammonium carboxylate of formula (1) may act as such as a wood preservative, with its quality and quantity selected so as to protect the wood from micro-organisms. In an aqueous solution, the weight ratio of organic ammonium carboxylate of formula (1) to water is then particularly in the range 1:20-20:1, preferably in the range 1:6-1:1. In this embodiment, the wood preservative contains typically 5-95% by weight of the agent of formula (1) and 95-5% by weight of water, preferably 15-45% by weight of the agent of formula (1) and 85-55% by weight of water. The organic ammonium carboxylate under consideration can be spreaded onto the wood. However, it is preferably absorbed into the wood at a rate of at least 100 $kg/m^3$, more advantageously at least 200 $kg/m^3$, calculated on the initial wood volume. Given the exceptionally good absorption into wood and retention in wood, one embodiment of the invention does not require environmentally hazardous copper and/or zinc to be included in the aqueous solution.

Since the organic ammonium carboxylate of formula (1) is well absorbed into wood, it can, in another embodiment, be used as a carrier of other active ingredients, such as active ingredients protecting the wood from micro-organisms. The carrier then dissolves the active ingredient, transfers it in large amounts into the wood, and retains it in the wood. Consequently, the quality and quantity of the ammonium carboxylate under consideration can be selected so that it transfers the wood-preservative agent to the wood. The organic ammonium carboxylate and the active ingredient are typically absorbed into the wood at a minimum rate of 100 $kg/m^3$, preferable a minimum rate of 200 $kg/m^3$, calculated on the initial wood volume.

It has been found that the organic ammonium carboxylate of formula (1) is particularly suitable for transferring a wood preservative active ingredient into the wood that is a mixture or a reaction product of an organic active ingredient salt and an organic active ingredient acid.

The organic active ingredient salt component of the active principle is preferably selected from the group comprising alkali metal, earth alkali metal and ammonium salts of aromatic acids, alkali metal, earth alkali metal and ammonium salts of aliphatic and aromatic sulphonic acids and acid salts of amines. Particularly advantageous organic active ingredient salts comprise sodium benzoate, sodium alkyl benzene sulphonate, cetyl pyridinium chloride and a salt of formic acid and ethanolamine. The latter also acts as a well absorbable organic ammonium carboxylate according to formula (1).

The organic active ingredient acid component of the active principle is preferably selected from the group comprising aromatic carboxylic and sulphonic acids, fatty acids, organic hydoxylic acids and their oligomers and chelating acids. Preferred substances comprise benzoic acid, $C_6$-$C_{20}$ fatty acid, preferably $C_{12}$-$C_{18}$ fatty acid such as stearic acid, and ethylenediaminetetraacetic acid (EDTA). A mixture of benzoic acid and a $C_{12}$-$C_{18}$ fatty acid such as stearic acid is a particularly advantageous organic active ingredient component.

An advantageous combination of organic active ingredient acid and organic ingredient salt/ammonium carboxylate is EDTA+salt of ethanolamine together with formic acid and/or propionic acid.

The organic ammonium carboxylates according to formula (1) of the invention also serve for transferring other types of wood preservatives into wood, such as acidic copper chromate, ammoniacal copper zinc arsenate, chromate-containing copper arsenate, ammoniacal copper quaternary salt, copper bis (dimethyldithiocarbamate), ammoniacal copper citrate, copper azol-A and borate compound. Other applicable commercial wood preservatives (fungicides, insecticides, termicides etc.) comprise the active ingredients used in the brands Preventol® and K-Othrine®. Examples of these are Preventol® A8 (Tebucanazole), Preventol® MP 100 (IPBC), Preventol® HS11-N (Pyrethroide), K-Othrine® 100 (Deltametrin)

When the ammonium carboxylates of formula (1) are used to transfer the copper compounds used as active ingredients mentioned above into the wood material, a mixture of two phases is produced as the ammonium carboxylates and the copper compounds react, because these copper compounds are water-insoluble. The first phase then contains an insoluble copper compound and the second phase contains an ammonium carboxylate complex or ionised ammonium carboxylate. The invention does not relate to a method for transferring merely a reaction product of ammonium carboxylate and copper compound into wood.

The wood preservative active ingredient is typically in the form of an aqueous solution or dispersion having an active ingredient concentration of preferably 0.5-95% by weight, more advantageously 1-10% by weight. Thus a typical aqueous wood preservative solution contains 15-45% by weight of the ammonium carboxylate of formula (1) and 1-10% by weight of some other wood preservative active ingredient, the remainder being substantially water.

In a second embodiment, the ammonium carboxylate of formula (1) is used for transferring other substances into the wood as well. Typical such substances comprise anti-oxidants, free-radical capturers and UV protective agents.

Usually ammonium carboxylate of formula (1) as mentioned above is absorbed into wood by impregnating the wood with this agent or an aqueous solution of it under vacuum. The typical impregnating period is 1-120 minutes and the typical treatment temperature is 80-160° C. After impregnation the wood is usually rinsed.

The invention also relates to a wood preservative composition containing organic ammonium carboxylate, which is characterised by the organic ammonium carboxylate having the formula:

$$[NR^1R^2R^3R^4]^+{}_n[R^5(COO)_n]^{-n} \quad (1)$$

in which $R^1$, $R^2$ and $R^3$ have been selected from the group comprising hydrogen, substituted alkyls having 1-6 carbon atoms and unsubstituted alkyls having 1-6 carbon atoms, $R^4$ is a substituted alkyl having 1-6 carbon atoms or an unsubstituted alkyl having 1-6 carbon atoms, $R^5$ is hydrogen, a substituted hydrocarbyl having 1-6 carbon atoms or an unsubstituted hydrocarbyl having 1-6 carbon atoms, and n is an integer between 1-6.

The wood preservative composition in accordance with the invention thus contains the same organic ammonium carboxylate of formula (1) as the one used in the wood preparation method described above. Hence the technical special features above relating to the organic ammonium carboxylate and its composition also apply to the wood preservative composition of the invention. For this reason, only a number of crucial features of the composition will be repeated below.

In the organic ammonium carboxylate of formula (1) in the wood preservative composition, $R^5$ is preferably hydrogen, methyl or ethyl. $R^1$ is preferably hydrogen, $R^2$ and $R^3$ have preferably been selected from the group comprising hydrogen and 2-hydroxy ethyl, and $R^4$ is preferably 2-hydroxy ethyl.

Hence the organic ammonium carboxylate of formula (1) in the composition has preferably been selected from the group comprising a salt of formic acid and monoethanolamine, a salt of propionic acid and monoethanolamine or a mixture of these salts. The weight ratio of the mixture is preferably in the range 80:20-20:80.

The organic ammonium carboxylate of formula (1) in the composition is typically in the form of an aqueous solution having typically a concentration of 5-95% by weight, preferably 15-45% by weight. The organic ammonium carboxylate may act alone in the composition or together with an active ingredient as a microbicide protecting wood for microbes.

The active ingredient is preferably a mixture or a reaction product of an organic active ingredient salt and an organic active ingredient acid. The organic active ingredient salt is typically sodium benzoate, sodium alkyl benzene sulphonate, cetyl pyridinium chloride, a salt of formic acid and ethanolamine, or a mixture of these. The organic active ingredient acid is typically benzoic acid, stearic acid, ethylenediaminetetraacetic acid (EDTA) or a mixture of these.

A preferred wood preservative composition contains 15-45% by weight of said quaternary ammonium carboxylate of formula (1), 1-10% by weight of wood microcide, the remainder being substantially water.

The invention also relates to the use of the composition described above for preparing wood by impregnating the wood with this composition. It has also been surprisingly found that the ammonium carboxylate of the invention can be used either as such or together with known anti-corrosive agents for making wood corrosion-free, less corrosive or anti-corrosive. After preparation, the wood will prevent or reduce corrosion of metal bodies such as nails, screws or the like getting into contact with the wood Last, the invention relates to an impregnated wooden product, which can be produced substantially by the method described in claims 1-18 of this specification or the description.

A number of examples are given below with the sole purpose of illuminating the invention.

1. OBJECTIVE

Studies are made in, order to determine the microbicide effect of the system combining an ammonium carboxylate carrier and an active ingredient of the invention against micro-organisms that damage wood (mildews and blue stain and rot fungus).

2. MATERIALS AND METHODS 2.1 Ammonium Carboxylate Carriers

Two ammonium carboxylate carrier mixtures were selected for the tests, with the water-soluble mixtures selected as shown in the accompanying table (table 1). A White Spirit solvent was additionally used as a reference carrier.

TABLE 1

Ammonium carboxylate carriers selected for the tests.

| Ammonium carboxylate carrier | Proportion of total carrier, % |
|---|---|
| MHEA | 100 |
| MHEA/PHEA | 70/30 |

MH = formic acid (actually its anion, i.e. formiate)

EA = ethanolamine (actually its cation, i.e. ethanolammonium)

PH = propionic acid (actually its anion, i.e. propionate)

2.2 Active Ingredients and Their Mixtures

The active ingredients under study consisted of the commercial and new solutions listed in the central column of the following tables (2 and 3). The right-hand column of the tables corresponds to the ammonium carboxylate solutions used in accordance with table 1.

TABLE 2

Active ingredient and carrier mixtures used in decay tests

| Example | Active ingredient and its concentration | Carrier and its concentration |
|---|---|---|
| | Commercial active ingredient: | |
| 1 | 5% of Tebuconazole | 30% of MHEA |
| 2 | 5% of Tebuconazole | 30% of MHEA/PHEA |
| | New active ingredient: | |
| 3 | 5% of benzoic acid | 30% of MHEA |
| 4 | 5% of benzoic acid | 30% of MHEA/PHEA |
| 5 | 5% of EDTA in acid form | 30% of MHEA |
| 6 | 5% of EDTA in acid form | 30% of MHEA/PHEA |
| 7 | 5% of CEBE 2 | 30% of MHEA |
| 8 | 5% of CEOS | 30% of MHEA |
| 9 | 5% of BHTEB | 30% of MHEA |
| 10 | 5% of BEPRE | 30% of MHEA |
| 11 | 5% of SBBW-30 | 100% of White Spirit |
| Comparisons: Untreated wood | | |
| 12 (ref.) | — | — |
| Wood treated with carrier alone | | |
| 13 (ref.) | — | 30% of MHEA |
| 14 | — | 30% of MHEA/PREA |
| 15 (ref.) | — | 100% of White Spirit |

EDTA = ethylenediaminetetraacetic acid

CEBE2 = 43% of MHEA + 43% of cetyl pyridinium benzoate + 9% Preventol MP100 + 5% EDTA CEOS = 13% of stearic acid + 33% of lactic acid-oligomer + 6% of cetyl pyridium chloride + 48% of MHEA BHTEB = 5% of Preventol A8 + 5% of benzoic acid + 90% of MHEA BEPRE 100 = 4% of Preventol MP100 + 92% of MHEA SBBW-30 = 30% (25% of stearic acid + 12% benzoic acid + 65% of benzoic acid alkylchloride) + 70% White Spirit Preventol A8 = Tebuconazole Preventol MP 100 = IBPC = 3-iodine-2-propynyl butyl carbonate

TABLE 3

Active ingredient mixtures used in mildew and blue stain tests

| Example | Active ingredient and its concentration | Carrier and its concentration |
|---|---|---|
| | Commercial active ingredient | |
| 16 | 5% of IBPC | 30% of MHEA |
| 17 | 5% of IBPC | 30% of MHEA/PREA |
| | New active ingredient | |
| 18 | 5% of benzoic acid | 30% of MHEA |
| 19 | 5% of benzoic acid | 30% of MHEA/PREA |
| 20 | 5% of EDTA in acid form | 30% of MHEA |
| 21 | 5% of EDTA in acid form | 30% of MHEA/PREA |
| 22 | 5% of SBB | 30% of MHEA |
| 23 | 5% of CEBE2 | 30% of MHEA |
| 24 | 5% of CEOS | 30% of MHEA |
| 25 | 5% of BHTEB | 30% of MHEA |
| 26 | 5% of BEPRE100 | 30% of MHEA |
| 27 | 5% of SBBW-30 | 100% of White Spirit |
| Comparisons: Untreated wood | | |
| 28 (ref.) | — | — |
| Wood treated with carrier alone | | |
| 29 (ref.) | — | 30% of MHEA |
| 30 | — | 30% of MHEA/PREA |
| 31 (ref.) | — | 100% of White Spirit |

IBPC = 3-iodine-2-propynylbutylcarbonate 2.3 Extraction Tests of the Wood Material Oven-dry pine surface samples (15×15×5 mm) were extracted under five different extraction schedules (schedules 1-5). Unprocessed (unextracted) wood samples were used as reference material for the extracted wood material.

Extraction Schedule 1, Water Extraction

The wood samples were impregnated (vacuum impregnated) with water before extraction. The water-impregnated samples were extracted in an autoclave for 20 minutes at a temperature of 121° C.

Extraction Schedule 2, MHEA1

Wood samples were impregnated (vacuum impregnation) with a 50% MHEA carrier and the impregnated samples were extracted in an autoclave for 20 minutes at a temperature of 121° C. Then the samples were rinsed with cold water until the rinsing water was limpid (at least 3-4 rinses, one water rinse=in water over night under press).

Extraction Schedule 3, MHEA2

Wood samples were impregnated (vacuum impregnation) with a 50% MHEA carrier and the impregnated samples were extracted in an autoclave for 20 minutes at a temperature of 121° C. Then the samples were rinsed with cold water under press over night (one rinse).

Extraction Schedule 4, Solvent Extraction

Wood samples were extracted with acetone in a Soxhlet apparatus for 4 hours. After this the samples were further extracted with distilled water in a Soxhlet apparatus for 4 hours. The samples were not dried between the extractions.

Extraction Schedule 5, Solvent-MHEA-Extraction

Wood samples were extracted with acetone in a Soxhlet apparatus for 4 hours. Then the samples were further extracted with distilled water in a Soxhlet apparatus for 4 hours. The samples were not dried between the extractions. After the water extraction, the samples were air dried and impregnated (vacuum impregnation) with a 50% MHEA carrier. After they had been impregnated, the samples were rinsed with water under press over night.

2.4. Biological Effectiveness of Mixtures of Active Ingredient and Ancat and Extracted Wood 2.4.1 Decay Tests Small pine surface samples (15 mm×15 mm×5 mm) were vacuum impregnated with the active ingredient carrier mixture under study (table 2). Untreated samples and samples treated merely with ancat carriers or a White Spirit solvent were used as a reference. The brown-rot fungus *Coniophora-puteana*, BAM Ebw was selected as the test fungus. The fungus strain is derived from the strain collections of VTT Technical Research Centre of Finland, Building, Built Environment.

The amounts of mixtures of active ingredient-carrier absorbed into the samples (retention kg/m$^3$) were determined by calculatory means and dry basis weighing (dry weights of the samples before and after impregnation and rinsing). Part of the samples was rinsed with water before the decay tests were started. The rinsing was performed by impregnating the pieces with water and rinsing the samples under water for 4 days. The rinse water was renewed four times during the rinsing operation. The rinsing was performed under modified EN 84 standard. The amounts of active ingredient-carrier absorbed into the samples were determined also after the rinse.

The decay tests were conducted under accelerated and modified EN 113 standard. The reference samples and both unrinsed and rinsed test samples were allowed to decay over a period of 5 weeks. The effectiveness of the impregnation treatments was determined on the basis of the weight loss caused by the fungus.

2.4.2 Mildew and Blue Stain Tests

In mildew and blue stain tests, pine surface wood samples (25×50×5 mm) were vacuum impregnated with mixtures of active ingredient and carrier (table 3). The samples were not rinsed.

The anti-mildew and anti-blue stain effect of the mixtures of active ingredient and carrier and their references were examined in a laboratory by a suspending method. The test samples and the reference samples were suspended in random order in exposure chambers. The relative humidity in the chambers was regulated by means of water in the range 95-100% at a test temperature of 20° C. (+/−2° C.).

Blue stain and mildew fungus suspensions were injected into the test boxes before the test was started. The mildew suspension contained three mildew species that thrive in wood: *Aspergillus versicolor* (E1), *Gladosporium sphaerospermum* (R7) and *Penicillium* sp. (1017). The blue stain suspension consisted of the following species: *Aureobasidium pullulans* (T1), *Sclerophoma entoxylina* (Z17) and *Ceratocystispilifera* (Z11). The fungus strains are derived from the strain collections of VTT Technical Research Centre of Finland, Building, Built Environment. The moulding of the test samples was monitored visually at the end of 2, 4, 6, 8 and 10 weeks from the start of the test on a scale 0-5.

0=no growth s1=marks of starting growth (microscopically observable)

2=1-10% of the area covered by microbial growth (microscopically observable)

3=10-30% of the area covered by microbial growth (visually observable)

4=30-70% of the area covered by microbial growth (visually observable)

5=100% of the area covered by microbial growth (visually observable)

3. RESULTS 3.1 Anti-Decay Effect of the Mixtures of Active Ingredient and Carrier and the Extraction Schedules The cellar fungus (*C. puteana*) is a brown-rot fungus that causes weight loss and reduces the strength of wood material. The metabolism of brown-rot fungi utilises the hydrocarbon structural components of wood (hemi-cellulose and cellulose) and also modifies the lignin structure. If brown rot proceeds over a long period, there will remain only brittle lignin, which decomposes into dust even under light stress.

The results of the decay tests are illustrated in FIGS. 1-3. The results indicate that all of the mixtures of active ingredient and carrier and ancat carriers under study, when not rinsed, prevented alone the decay caused by *C. puteana* in an accelerated decay test. In all the cases, the weight loss of the samples was smaller than the weight loss set as the preservative effect limit under the EN 113 standard (≦3%).

A weight loss of less than 3% was achieved in the rinsed samples when the preservative contained tebuconazole-MHEA, tebuconazole-MHEA+PREA, CEBE2-MHEA, CEOS-MHEA or BHTEB-MHEA. A weight loss limit of almost 3% was achieved with rinsed samples containing benzoic acid-MHEA+PREA (4.2% by weight loss) or EDTA-MHEA+PREA in acid form (5.2% weight loss). The rinse clearly reduced the anti-decay effect of benzoic acid-MHEA (7.3% by weight weight loss) and of EDTA-MHEA in acid form (12.7% weight loss).

When unrinsed, both the ancat carriers prevented efficiently the weight loss caused by rot fungus in the test samples. The effectiveness of MHEA+PREA decreased after rinsing, and a weight loss of 9% was stated in the test samples. WhiteSpirit did not prevent the weight loss caused by rot fungus. By contrast, a mixture of SBBW30 and WhiteSpirit proved to have a high anti-decay effect both when rinsed and not rinsed.

The objective of the extraction tests was to determine whether removal of e.g. soluble sugars or structural components soluble in the carrier increases the decay resistance of wood. Ancat carriers have proved (cf. the results of the extraction tests) to extract hydrocarbons and particularly xylane of hemi-cellulose from the wood material. The results of the decay tests indicated that water extraction (extraction schedule 1), MHEA1 (extraction schedule 2) and solvent extraction (extraction schedule 4) did not increase the decay resistance of extracted wood material (weight losses>30%). By contrast, in samples treated under extraction schedules 3 (MHEA2) and 5 (solvent-MHEA extraction) the weight loss caused by rot fungus was under the 3% limit prescribed by the standard.

FIG. 3. Effect of the extraction schedules on the anti-decay properties of wood material.

Table 4 presents the active ingredient-carrier contents absorbed into the samples during impregnation. The contents were relatively high, with variations in the range 190-240 kg/m$^3$. Rinsing had no notable effect on the absorption.

TABLE 4

Active ingredient contents in the test samples after impregnation and rinsing.

| Example | Mixture active ingredient-carrier | Not rinsed | Retention kg/m$^3$ Rinsed |
|---|---|---|---|
| 13 | MHEA | 201 | 194 |
| 14 | MHEA + PREA | 182 | 182 |
| 3 | Benzoic acid-MHEA | 213 | 225 |
| 4 | Benzoic acid-MHEA/PREA | 204 | 214 |
| 5 | EDTA-MHEA in acid form | 222 | 217 |
| 6 | EDTA-MHEA/PREA in acid form | 209 | 203 |
| 1 | Tebuconazole-MHEA | 222 | 222 |
| 2 | Tebuconazole-MHEA/PREA | 194 | 193 |
| 7 | CEBE2-MHEA | 205 | 208 |
| 8 | CEOS-MHEA | 231 | 233 |
| 9 | BHTEB-MHEA | 235 | 235 |
| 10 | BEPRE100-MHEA | 236 | 228 |

3.2 Anti-Mildew and Ant-Blue Stain Effect of Mixtures of Active Ingredient/Carrier and Extraction Schedules Blue stain fungi penetrate into the wood material structure, and by staining the wood, they entail discolouration and alter the moisture behaviour of the material (the material will have higher water absorption). The metabolism of blue stain fungi utilises mainly soluble nutrients, and they do not usually produce weight losses or decrease the strength of the wood. By contrast, mildew fungi grow only on the surface of the wood material. Mildews do not penetrate into the material structure and thus do not cause weight losses or decreased strength. Mildews live on the soluble nutrient present on the material surface. The damages caused by mildews relate to discolouration and malodour and possible health hazards.

The blue stain tests did not yield any results. Blue stain was not observed in one single treated or untreated sample during an exposure period of 10 weeks. In the case of the untreated reference, this zero result may also be partly due to excessive moisture of the samples, which in turn is caused by the hygroscopicity of the mixtures of active ingredient and carrier, to the susceptibility of blue stain fungi to the compounds under study and/or to transfer of the active ingredients also to the untreated reference sample, owing to the high transfer potential of the carrier.

The results of the mildew tests are shown in FIGS. 4-6. The corresponding examples are given in table 3. Mildew growth was prevented completely in an exposure test of 10 weeks when the samples were treated with the following mixtures of active ingredient and carrier: benzoic acid-MHEA- (example 18), benzoic acid-MHEA+PREA (example 19), EDTA-MHEA in acid form (example 20), EDTA-MHEA-PREA in acid form (example 21), SBB-MHEA (example 22), CEBE2-MHEA (example 23) and BEPRE100-MHEA (example 26) and SBBW30-WhiteSpirit. In untreated control samples and test samples treated with WhiteSpirit, moulding reached the mildew index 5 (100% of the sample surface was covered by mildew growth) after 6 weeks' exposure. Moderate mildew growth was observed in the two samples treated with ancat carriers. The mildew index reached the value 2 during the exposure (mildew growth not yet visible). Moderate mildew growth (mildew index 2) was also observed in test samples treated with active ingredient mixtures of CEBE2-MHEA (example 23) and CEOS-MHEA (example 24).

The objective of the extraction tests was to determine whether the removal of e.g. soluble sugars or structural components soluble in the carrier increases the mildew resistance of the wood. The results of the mildew tests show that water extraction (extraction schedule 1), MHEA2 (extraction schedule 3) and solvent extraction (extraction schedule 4) did not increase the mildew resistance of the extracted wood material, with a mildew index variation between 3 and 5 in these cases (visible and abundant growth). On the contrary, moulding was moderate in samples treated under extraction schedules 2 and 5 (MHEAI and solvent-MHEA extraction) (mildew index 1 or less).

4. CONCLUSIONS

The mixtures of active ingredient and carrier were observed to have a distinct preventive potential both with respect to decay and to mildew formation. The decay tests determined the anti-decay effect of MH/EA and MH/EA+PR/EA carriers and of active ingredients mixed in these (benzoic acid, EDTA in acid form, tebuconazole, CEBE2, BHTEB, BEPRE 100-MHEA, CEOS). The decay tests also determined the effect of SBB dissolved in a WhiteSpirit solvent. Wood samples extracted under five different extraction schedules were also included in the decay tests.

The mixtures of active ingredient and carrier efficiently prevented decay caused by *C. puteana* in an accelerated decay test. The test results indicated that the mixtures of active ingredient and carrier efficiently prevented weight loss caused by rot fungus in the treated wood samples also after rinsing. The most efficient active ingredient mixtures with the highest anti-decay potential occurred among the formulations produced by the company Granula Oy.

The mildew and blue stain tests, in turn, determined the anti-mildew effect and anti-blue stain effect of MH/EA and MH/EA+PR/EA carriers and of active ingredients mixed in these carriers (benzoic acid, EDTA, IBPC, SBB, CEBE2, CEOS, BHTEB, BEPRE 100-MHEA in acid form) and SBB dissolved in a WhiteSpirit solvent. The test results showed that the mixtures of active ingredient and carrier actively prevented mildew growth on the surface of the treated wood samples during an exposure period of 10 weeks. No blue staining was observed. This result may be due to excessive moisture of the samples, which in turn was caused by the hydroscopicity of the mixtures of active ingredient and carrier, to the susceptibility of blue stain fungi to the compounds under study and/or to transfer of active ingredients also to the untreated reference sample, owing to the high transfer potential of the carrier.

The effect of extraction of the soluble and structural components of wood material on decay and mildew formation was determined by treating the wood material under five different extraction schedules. Water and solvent extractions had no effect on the decay and mildew resistance of the wood material. Decay caused by *C. puteana* was inhibited in the cases where the wood material contained a carrier after the extraction.

The invention claimed is:

1. A method for treating wood, in which the wood is brought into contact with a liquid or water-soluble organic ammonium carboxylate, characterized in that the organic ammonium carboxylate has the formula (1):

$$[NR^1R^2R^3R^4]^+{}_n[R^5(COO)_n]^{-n} \quad (1),$$

in which $R^1$, $R^2$ and $R^3$ are selected from the group comprising hydrogen, substituted and unsubstituted alkyls containing 1-6 carbon atoms, $R^4$ is a substituted or unsubstituted alkyl containing 1-6 carbon atoms, $R^5$ is hydrogen, a substituted or unsubstituted hydrocarbon containing 1-6 carbon atoms and n is an integral 1-6.

2. A method as defined in claim 1, characterized in that $R^5$ is hydrogen, a substituted or unsubstituted alkyl containing 1-6 carbon atoms, hydrogen, a substituted or unsubstituted alkyl containing 1-4 carbon atoms, and n is 1.

3. A method as defined in claim 2, characterized in that $R^5$ is hydrogen, methyl or ethyl.

4. A method as defined in claim 1, characterized in that $R^1$ is hydrogen, $R^2$ and $R^3$ are selected from the group comprising hydrogen and $C_1$-$C_6$ alkyls substituted with a hydroxyl group, and $R^4$ is a $C_1$-$C_6$-alkyl substituted with a hydroxyl group.

5. A method as defined in claim 4, characterized in that $R^1$ is hydrogen, $R^2$ and $R^3$ are selected from the group comprising hydrogen and ethyl substituted with a hydroxyl group, in the group comprising hydrogen and 2-hydroxyethyl, and $R^4$ is an ethyl substituted with a hydroxyl group.

6. A method as defined in claim 1, characterized in that the organic ammonium carboxylate of formula (1) is a salt of formic acid and monoethanolamine or a salt of propionic acid and monoethanolamine.

7. A method as defined in claim 6, characterized in that the organic ammonium carboxylate of formula (1) is a mixture of a salt of formic acid and monoethanolamine and a salt of propionic acid and monoethanolamine.

8. A method as defined in claim 1, characterized in that the organic ammonium carboxylate of formula (1) is in the form of an aqueous solution, in which the ammonium carboxylate concentration is in the range 5-95% by weight.

9. A method as defined in claim 8, characterized in that the aqueous solution contains organic ammonium carboxylate of formula (1) and water in a weight ratio in the range 1:20-20:1.

10. A method as defined in claim 1, characterized in that the organic ammonium carboxylate of formula (1) is selected with a quality and quantity such that it protects wood against micro-organisms.

11. A method as defined in claim 1, characterized in that the organic ammonium carboxylate of formula (1) is selected with a quality and quantity such that it transfers a microcide active ingredient into the wood, the wood being impregnated with organic ammonium carboxylate at least at a rate of 100 $kg/m^3$, calculated on the initial wood volume.

12. A method as defined in claim 11, characterised characterized in that the wood-preservative active ingredient is a mixture or a reaction product of an organic active ingredient salt and an organic active ingredient acid.

13. A method as defined in claim 12, characterized in that the organic active ingredient salt is selected from the group comprising sodium benzoate, sodium alkyl benzene sulphonate, cetyl pyridinium chloride and a salt of formic acid and ethanolamine.

14. A method as defined in claim 12, characterized in that the organic active ingredient acid is selected from the group comprising benzoic acid, $C_6$-$C_{20}$ fatty acid and ethylenediaminetetraacetic acid (EDTA).

15. A method as defined in claim 14, characterized in that the organic active ingredient acid is a mixture of benzoic acid and $C_{12}$-$C_{18}$ fatty acid.

16. A method as defined in claim 15, characterized in that the wood-preservative active ingredient is a mixture of EDTA with ethanolamine and a salt of formic acid and/or propionic acid.

17. A method as defined in claim 12, characterized in that the wood-preservative active ingredient is in the form of an aqueous solution or a dispersion having an active ingredient concentration in the range 0.5-95% by weight.

18. A method as defined in claim 1, characterized in that wood is treated by impregnating it with liquid or water-soluble organic ammonium carboxylate and any active ingredient.

19. A wood preservative composition containing organic ammonium carboxylate, characterized in that the organic ammonium carboxylate has the formula (1):

$$[NR^1R^2R^3R^4]^+{}_n[R^5(COO)_n]^{-n} \quad (1),$$

in which $R^1$, $R^2$ and $R^3$ are selected from the group comprising hydrogen, substituted and unsubstituted alkyls containing 1-6 carbon atoms, $R^4$ is a substituted or unsubstituted alkyl containing 1-6 carbon atoms, $R^5$ is hydrogen, a substituted or unsubstituted hydrocarbon containing 1-6 carbon atoms and n is an integral 1-6, and the composition contains additionally an active ingredient protecting the wood against micro-organisms.

20. A composition as defined in claim 19, characterized in that $R^5$ is hydrogen, a substituted or unsubstituted alkyl containing 1-6 carbon atoms, $R^5$ is hydrogen, a substituted or unsubstituted alkyl containing 1-4 carbon atoms, and n is 1 or 2, 1.

21. A composition as defined in claim 20, characterized, in that $R^5$ is hydrogen, methyl or ethyl.

22. A composition method as defined in claim 19, characterized in that $R^1$ is hydrogen, $R^2$ and $R^3$ are selected from the group comprising hydrogen and $CrC_6$ alkyls substituted with a hydroxyl grout, in the group comprising hydrogen and $C_1$-$C_6$ alkyls substituted with a hydroxyl group, and $R^4$ is a $C_1$-$C_6$-alkyl substituted with a hydroxyl group.

23. A composition as defined in claim 22, characterized in that $R^1$ is hydrogen, $R^2$ and $R^3$ are selected from the group comprising hydrogen and ethyl substituted with a hydroxyl group, in the group comprising hydrogen and 2 hydroxyethyl, and $R^4$ is an ethyl substituted with a hydroxyl group.

24. A composition as defined in claim 19, characterized in that the organic ammonium carboxylate of formula (1) is a salt of formic acid and monoethanolamine or a salt of propionic acid and monoethanolamine.

25. A composition as defined in claim 24, characterized in that the organic ammonium carboxylate of formula (1) is a mixture of a salt of formic acid and monoethanolamine and a salt of propionic acid and monoethanolamine.

26. A composition as defined in claim 19, characterized in that the organic ammonium carboxylate of formula (1) is in the form of an aqueous solution, in which the organic ammonium carboxylate concentration is in the range 5-95% by weight.

27. A composition as defined in claim 19, characterized in that the organic ammonium carboxylate of formula (1) is selected with a quality and quantity such that it protects the wood against micro-organisms by itself.

28. A composition as defined in claim 19, characterized in that the wood-preservative active ingredient is a mixture or a reaction product of an organic active ingredient salt and an organic active ingredient acid.

29. A composition as defined in claim 28, characterized in that the organic active ingredient salt is selected from the group comprising alkali metal, earth alkali metal and ammonium salts of aromatic acids, alkali metal, earth alkali metal and ammonium salts of aliphatic and aromatic sulphonic acids and acid salts of amines.

30. A composition as defined in claim 29, characterized in that the organic active ingredient salt is selected from the group comprising sodium benzoate, sodium benzene sulphonate, cetyl pyridinium chloride and a salt of formic acid and ethanolamine.

31. A composition as defined in claim 28, characterized in that the organic active ingredient acid is selected from the group comprising aromatic carboxylic and sulphonic acids, fatty acids, organic hydroxylic acids and their oligomers and also chelating acids.

32. A composition as defined in claim 31, characterized in that the organic active ingredient acid is selected from the group comprising benzoic acid, $C_6$-$C_{20}$ fatty acids.

33. A composition as defined in claim 32, characterized in that the organic active ingredient acid is a mixture of benzoic acid and $C_{12}$-$C_{18}$ fatty acid.

34. A composition as defined in claim 33, characterized in that the wood-preservative active ingredient is a mixture of EDTA with a salt of ethanolamine and formic acid and/or propionic acid.

35. A composition as defined in claim 19, characterized in that the wood-preservative active ingredient has the form of an aqueous solution or dispersion containing active ingredient in concentration of 0.5-90% by weight.

36. A composition as defined in claim 19, characterized in containing 15-45% by weight of said quaternary ammonium carboxylate of formula (1), 1-10% by weight of active ingredient protecting wood against micro-organisms, the remainder being substantially water.

37. A wooden treated product prepared by the method defined in claim 1.

38. A method as defined in claim 1, characterized in that $R^5$ is hydrogen, a substituted or unsubstituted alkyl containing 1-6 carbon atoms, hydrogen, a substituted or unsubstituted alkyl containing 1-4 carbon atoms, and n is 2.

39. A method as defined in claim 1, characterized in that $R^1$ is hydrogen, $R^2$ and $R^3$ are selected from the group comprising hydrogen and $C_1$-$C_4$ alkyls substituted with a hydroxyl group, and $R^4$ is a $C_1$-$C_4$-alkyl substituted with a hydroxyl group.

40. A method as defined in claim 4, characterized in that $R^1$ is hydrogen, $R^2$ and $R^3$ are selected from the group comprising hydrogen and ethyl substituted with a hydroxyl group, preferably in the group comprising hydrogen and 2-hydroxyethyl, and $R^4$ is an ethyl substituted with 2-hydroxy ethyl.

41. A method as defined in claim 6, characterized in that the organic ammonium carboxylate of formula (1) is a mixture of a salt of formic acid and monoethanolamine and a salt of propionic acid and monoethanolamine in the weight ratio 80:20-20:80.

42. A method as defined in claim 1, characterized in that the organic ammonium carboxylate of formula (1) is in the form of an aqueous solution, in which the ammonium carboxylate concentration is in the range 15-45% by weight.

43. A method as defined in claim 8, characterized in that the aqueous solution contains organic ammonium carboxylate of formula (1) and water in a weight ratio in the range 1:6-1:1.

44. A method as defined in claim 14, characterized in that the organic active ingredient acid is a mixture of benzoic acid and stearic acid.

* * * * *